United States Patent Office 2,926,085
Patented Feb. 23, 1960

2,926,085
DIETARY SUPPLEMENT FOR ANIMALS

Petrus J. Geerlings, Waterloo, Iowa

No Drawing. Application April 29, 1959
Serial No. 809,602

6 Claims. (Cl. 99—2)

This invention relates to a dietary supplement for preventing nutritional anemia in livestock, particularly pigs, and is a continuation-in-part of my copending application Serial No. 645,019, filed March 11, 1957, now abandoned. It has long been appreciated that a relatively high proportion of baby pigs are lost prior to weaning from causes directly attributable to nutritional anemia and that many more are lost from secondary causes indirectly attributable to nutritional anemia (hereinafter referred to merely as "anemia"). This is due to the fact that sow's milk, normally the sole source of nourishment for pigs up to eight weeks, contains little or no iron or copper. It is not possible by any method of feeding the sow to increase the amount of these minerals in the milk. They must be supplied from an external source. Where the practice of early weaning using a dry cereal-base feed is employed (as set forth in my copending application Serial No. 375,-295), the minimum requirements of trace minerals, including iron and copper, are provided at the age of two or three weeks. Although the iron and copper are supplied belatedly, the pigs are not as thrifty and the weight gains are not as rapid as when the proper amount of iron and copper required to prevent anemia are supplied during the first week after farrowing.

The practice among swine farmers today is to orally administer to each pig a solution of an iron salt, for example, ferrous sulfate, from an oil can or to poke a capsule containing the necessary iron down the throat of the pig. This must be done during each of the first, second and third weeks after farrowing. As a practical matter, this method of providing mineral requirements has not worked out. Farmers try to treat each pig but find it extremely difficult to segregate those that have been treated from those that have not, or those that have been treated once from those that have been treated two or three times. The problem would be less difficult if the pigs were farrowed at the same time, but where a farmer has many litters whose ages range over a relatively broad period of time, the problem becomes more complicated. As a result, a very high proportion of unweaned pigs are anemic.

The ideal solution would be to place a mineral-containing composition near the pigs where they will eat it for themselves. Unfortunately, baby pigs from one to three or four weeks old do not take iron compounds of their own accord. None of the standard feeds containing minerals are formulated for the control or prevention of anemia, so they would not solve the problem even if the tiny pigs would eat them. I have found that if the mineral salts containing iron and copper for prevention of anemia are incorporated in a mixture of humus and soft phosphate with colloidal clay, tiny pigs will lick it up without hesitation. This was surprising. So far as I am aware no one has previously prepared an anemia preventative that tiny pigs would eat of their own free will. In my composition I use from 20 to 80 parts of humus and correspondingly from 80 to 20 parts of the colloidal clay. Trace minerals are included to provide not less than .00035% copper and a like amount of iron. The upper limit on the copper and iron content is not critical. The humus renders the composition palatable. The addition of the soft phosphate with colloidal clay takes up the moisture in the humus and prevents packing and freezing of the mixture. It also provides bone-building phosphates. The mixture is a free-flowing, relatively powdery solid which makes it easy to handle in dispensing to the pigs. Humus which has been dried to make it free-flowing and non-freezable is not palatable. The pigs will not touch it. Neither will they touch the colloidal clay without the humus. But the composition of the invention, which contains humus (with moisture) and colloidal clay plus the requisite quantities of trace minerals, is readily licked up even by tiny pigs two or three days old. It has also been determined by experimentation that small pigs will instinctively consume mineral-bearing compositions of this kind in proportion to their need. If the mineral deficiency of the body has been met, the pigs will not bother to consume any of the anti-anemia compound. On the other hand, where they have been starved of minerals, they take to the product of the invention very quickly and will consume a sufficient amount to meet the minimum requirements of iron and copper for prevention of anemia.

The humus which is used in this invention may be defined as a brown or black soil containing decomposed vegetable or animal matter and which contains from 10% to 60% moisture. Other types of soils, such as sandy soils or dried soils, are unsatisfactory for the purposes of the invention.

The soft phosphate with colloidal clay is produced as a by-product in the process of mining phosphate rock in the area around Dunnelson, Florida. In mining rock phosphate the loosened rock is washed before being ground. The wash water is allowed to accumulate in low places on the ground and the sediment picked up in the washing process settles out. This sediment gradually accumulates over a period of years and there have developed a number of these sediment deposits which contain thousands of tons of the product. In some cases, worked out rock phosphate deposits are used to impound the wash water. These quarry holes have also been filled with the sediment. This sediment has been officially named "soft phosphate with colloidal clay." It has been used previously as a phosphorous fertilizer and to a lesser extent as a source of phosphorous in livestock feeds. On the average, this material contains 15-20% calcium, 9% phosphorous and about 1½% fluorine. This material is also sometimes referred to as "colloidal phosphate." It is relatively low in cost and provides a rich source of phosphate for livestock. In the present invention the soft phosphate with colloidal clay appears to absorb the moisture in the humus to prevent caking or compacting of the composition. Obviously, a composition which is to be used as a feed must be free-flowing so that it can be poured into the feed pans where it is made available to the pigs.

Trace minerals are added to a mixture of humus and soft phosphate with colloidal clay to such an extent that the iron content is in excess of .00035% and preferably ranges between .04% and .20%. The iron must be present in a form which is readily absorbed by the bloodstream. Edible salts soluble in water, such as ferric ammonium citrate, ferrous carbonate, ferrous sulfate, and iron saccharate are suitable. Likewise, copper salts (copper sulfate) should be present to provide copper in excess of .00035% and preferably from .003% to .012% based upon the weight of the entire composition. The preferred composition will contain from 40% to 60% humus and correspondingly from 60% to 40% of soft phosphate with colloidal clay. The humus, clay and trace minerals are the essential ingredients. A preferred composition will also contain bone meal in the amount of 2% to 10% and trace minerals other than copper and iron, the total quantity of such minerals totaling from ½% to 5%. Other trace minerals include manganese, cobalt, nickel, potassium, zinc and sodium, which are present in the form of soluble edible salts. The bone meal aids in the production of a free-flowing material and improves the appearance of the product as well as enriching the product in calcium and phosphorous. If desired, antibiotics and vitamins may be added, but these are not essential.

If the moist humus content is below 20%, the mixture becomes non-palatable to the pigs. On the other hand, if the soft phosphate with colloidal clay is below 20%, the packing and freezing problem is not obviated.

To illustrate my invention, the following example is given:

Example I

| | Percent by weight |
|---|---|
| Humus | 45 |
| Soft phosphate with colloidal clay | 45 |
| Steamed bone meal | 8 |
| Trace minerals including .09% iron and .006% copper, based on the total mixture) | 2 |
| Total | 100 |

The ingredients are mixed together in any suitable mixer until the composition is uniform. The trace minerals may be mixed up in a portion of the soft phosphate with colloidal clay or in the bone meal, and that mixture may then be added to the other ingredients. This procedure insures uniform distribution of the minerals throughout the mix.

The composition which includes vitamins and antibiotics is as follows:

Example II

| | Percent by weight |
|---|---|
| Humus | 46.7 |
| Soft phosphate with colloidal clay | 45.0 |
| Aurofac (source of aureomycin) | 1.3 |
| Steamed bone meal | 5.0 |
| Trace minerals (including .09% iron and .006% copper, based on the total mixture) | 1.5 |
| Dry vitamin A | 0.2 |
| Vitamin D² | 0.3 |
| Total | 100.0 |

The compositions of the invention may be fed to pigs by making it available to them at the age of two or three days. The composition may be supplied in a shallow concrete pan or small feeder within reach of the pigs. The average litter of 8 pigs will consume approximately 10 pounds of a compositon such as that set forth in Example II in the first three weeks. A pig requires from 10–15 milligrams of iron per day and about 2 milligrams of copper per day during the first six weeks of its life. A pig need eat only about 1½ ounces of the compositions of the examples to get this requirement. As mentioned previously, pigs instinctively eat enough of the dietary supplement of the invention to meet their individual requirements. There is no problem with respect to over-dosage.

The compositions of the invention have been tested over a considerable period of time on hundreds of litters of pigs. It has been found to be substantially 100% effective in the prevention of anemia. Although the composition is particularly useful in preventing anemia among small pigs, it may also be fed to sows ten days before farrowing and up until ten days after farrowing, or to older pigs, particularly where they are confined.

Various modifications of my compositions will occur to those skilled in the art without departing from the true scope and spirit of my invention. It is my intention not to limit the invention other than as necessitated by the scope of the appended claims.

What I claim as new and desire to secure by Letters Patent of the United States is:

1. A pig anti-anemia dietary supplement comprising from 20 to 80 parts of humus and correspondingly from 80 to 20 parts of soft phosphate with colloidal clay in homogeneous admixture with water soluble trace minerals capable of being absorbed by the bloodstream, said minerals containing a minimum of .00035% copper and .00035% iron, said percentages being based upon the entire weight of the composition.

2. A pig anti-anemia dietary supplement comprising from 20 to 80 parts of humus and correspondingly from 80 to 20 parts of soft phosphate with colloidal clay in homogeneous admixture with water soluble trace minerals capable of being absorbed by the bloodstream, said minerals containing .0003% to .02% copper and .04% to .20% iron, said percentages being based upon the entire weight of the composition.

3. A pig anti-anemia dietary supplement comprising from 40 to 60 parts of humus and correspondingly from 60 to 40 parts of soft phosphate with colloidal clay in homogeneous admixture with water soluble trace minerals capable of being absorbed by the bloodstream, said minerals containing .0003% to .02% copper and .04% to .20% iron, said percentages being based upon the entire weight of the composition.

4. A pig anti-anemia dietary supplement comprising about equal parts of humus and soft phosphate with colloidal clay in homogeneous admixture with water soluble trace minerals capable of being absorbed by the bloodstream, said minerals containing a minimum of .0003% copper and .0003% iron, said percentages being based upon the weight of the entire composition.

5. A pig anti-anemia dietary supplement comprising about equal parts of humus and soft phosphate with colloidal clay in homogeneous admixture with 2–10% bone meal and ½–5% water soluble trace minerals capable of being absorbed by the bloodstream, said trace minerals containing not less than .00035% copper and .00035% iron, based on the weight of the entire composition.

6. A method for preventing anemia in baby pigs which comprises feeding pigs aged up to four weeks a composition comprising from 20 to 80 parts of humus and correspondingly from 80 to 20 parts of soft phosphate with colloidal clay in admixture with water soluble trace minerals capable of being absorbed by the bloodstream, said minerals containing at least .0003% copper and .0003% iron, based upon the entire weight of the composition.

References Cited in the file of this patent

UNITED STATES PATENTS

| 2,129,334 | Northern | Sept. 6, 1938 |
| 2,703,285 | Luther | Mar. 1, 1955 |

OTHER REFERENCES

Morrison: Feeds and Feeding, Morrison Pub. Co., Ithaca, N.Y., 1951, 21st ed., p. 123.